(12) United States Patent
Derkach et al.

(10) Patent No.: US 9,167,373 B2
(45) Date of Patent: Oct. 20, 2015

(54) MULTIPLE SIM SUPPORT WITH SINGLE MODEM SOFTWARE ARCHITECTURE

(75) Inventors: Andrey Derkach, Salo (FI); Sami Jutila, Oulu (FI); Jari J. Ruohonen, Tampere (FI); Zoran Stevanovic, Turku (FI); Quan Tat, Reading (GB)

(73) Assignee: Nokia Technologies Oy, Espoo (FI)

( * ) Notice: Subject to any disclaimer, the term of this patent is extended or adjusted under 35 U.S.C. 154(b) by 1245 days.

(21) Appl. No.: 12/925,216

(22) Filed: Oct. 14, 2010

(65) Prior Publication Data

US 2012/0093075 A1    Apr. 19, 2012

(51) Int. Cl.
*H04W 4/00* (2009.01)
*H04W 8/18* (2009.01)
*H04W 80/00* (2009.01)
*H04L 29/08* (2006.01)

(52) U.S. Cl.
CPC ............ *H04W 4/003* (2013.01); *H04W 8/183* (2013.01); *H04L 69/32* (2013.01); *H04W 80/00* (2013.01)

(58) Field of Classification Search
CPC ............................... H04W 4/00; H04W 4/003
USPC .......... 370/328, 327, 326, 330; 455/210, 211, 455/256, 273
See application file for complete search history.

(56) References Cited

U.S. PATENT DOCUMENTS

2010/0304782 A1*  12/2010  Chang et al. ............... 455/552.1
2011/0081951 A1*   4/2011  Hwang ........................ 455/558
2011/0105081 A1*   5/2011  Park et al. ................... 455/411
2011/0117909 A1*   5/2011  Cao et al. .................... 455/423
2011/0117965 A1*   5/2011  Gong et al. .................. 455/558
2011/0151858 A1*   6/2011  Lai ............................. 455/422.1
2011/0217969 A1*   9/2011  Spartz et al. ................ 455/422.1
2011/0294472 A1*  12/2011  Bramwell et al. ............ 455/413
2012/0135715 A1*   5/2012  Kang et al. .................. 455/412.1

OTHER PUBLICATIONS

"Mobile Phone Platform supports dual-SIM technology", ThomasNet News, http://news.thomasnet.com/fullstory/Mobile-Phone-Platform-supports-due-SIM-te, Sep. 23, 2010, 10 pgs.
"Touchscreen Cell Phone—Dual Active SIM + Large Display", http:www.chinavasion,com/product_infor.php/pName/touchscreen-cell-phone, Sep. 23, 2010, 5 pgs.
"Dual active sim phone Products, dual active sim phone Manufacturers & Qua . . . ", HIMFR, http://www.himfr.com/buy-dual_active_sim_phone/, Sep. 23, 2010, 3 pgs.
"Dual Active Sim-Dual Active Sim Manufactuers, Supplier and Exporters on ali . . . ", http:/www.alibaba.com/products/dual_active_sim/-----------50.html, Sep. 23, 2010, 10 pgs.

* cited by examiner

*Primary Examiner* — Hassan Kizou
*Assistant Examiner* — Abdelnabi Musa
(74) *Attorney, Agent, or Firm* — Harrington & Smith (57) ABSTRACT

Disclosed are methods, apparatus and computer program products that provide an enhanced multi-SIM wireless communication device. For example, a method includes providing in a wireless communication device a protocol stack software component composed of a first native protocol stack software and a second native protocol stack software each comprising layer 1, layer 2 and layer 3 protocol stack functionality. The first native protocol stack software and the second native protocol stack software are each associated with a respective subscriber identity module and are independent of one another. The method further includes providing in the wireless communication device a common software component that includes protocol stack framework software elements, a hardware arbitration layer and a hardware adaptation layer. The method further includes linking the protocol stack software component and the common software component into a modem software executable capable of operation with hardware of the wireless communication device.

21 Claims, 4 Drawing Sheets

MULTIPLE SIM SUPPORT WITH SINGLE MODEM SOFTWARE ARCHITECTURE

TECHNICAL FIELD

The exemplary and non-limiting embodiments of this invention relate generally to wireless communication systems, methods, devices and computer programs and, more specifically, relate to communication devices that are multi-SIM capable.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

A multiple subscriber identity module (SIM) communication device is one that can support simultaneous operation with two or more SIMs. For example, the communication device can have multiple parallel active calls simultaneously, with one call per SIM. One technique to implement this type of operation is to include more than one modem (modulator/demodulator) in the device and connect one SIM to each modem. In this context a modem can be considered to include digital baseband and radio frequency hardware, and modem software running on top of the hardware. However, having multiple independent modems in the device also increases the cost, which can be disadvantageous especially for consumer communication devices (e.g., cellular phones).

SUMMARY

The foregoing and other problems are overcome, and other advantages are realized, in accordance with the exemplary embodiments of this invention.

In accordance with a one aspect thereof the exemplary embodiments of this invention provide a method that comprises providing in a wireless communication device a protocol stack software component comprised of a plurality of native protocol stack software including at least a first native protocol stack software and a second native protocol stack software each comprising layer 1, layer 2 and layer 3 protocol stack functionality. The first native protocol stack software and the second native protocol stack software are each associated with a respective subscriber identity module and are independent of one another. The method further comprises providing in the wireless communication device a common software component comprised of protocol stack framework software elements (such as operating system, messaging infrastructure and other core service modules), a hardware arbitration layer and a hardware adaptation layer. The method further comprises linking the protocol stack software component and the common software component into a modem software executable capable of operation with hardware of the wireless communication device.

In accordance with another aspect thereof the exemplary embodiments of this invention there is also provided an apparatus that comprises at least one processor and at least one memory. The memory stores computer program code and a protocol stack software component comprised of a plurality of native protocol stack software including at least a first native protocol stack software and a second native protocol stack software each comprising layer 1, layer 2 and layer 3 protocol stack functionality, where the first native protocol stack software and the second native protocol stack software are each associated with a respective subscriber identity module and are independent of one another. The memory further stores a common software component comprised of protocol stack framework software elements, a hardware arbitration layer and a hardware adaptation layer. In the apparatus the memory and computer program code are configured, with the at least one processor, to cause the apparatus to link the protocol stack software component and the common software component into a modem software executable capable of operation with hardware of a wireless communication device.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

An optimal solution to the problem discussed above is to provision the device to have only one modem that is capable of supporting multiple SIM operation. That is, the single modem software running on top of the modem hardware should support operations with multiple SIM devices. The exemplary embodiments of this invention provide efficient techniques for accomplishing this goal.

One possible technique to update the software of a single modem to have multiple SIM support would be to revise the entire modem software code base. In this manner the modem software could then be designed to become fully multiple SIM aware. However, this approach is complex, time consuming and can be error prone.

The exemplary embodiments of this invention separate native protocol stack functionality from common services and hardware adaptation layers in the modem software. The protocol stack software part can be fully replicated for both code and data. Ultimately the replicated protocol stacks can be built from the same source code. The protocol stacks are independent from each other and do not have to perform any inter-protocol stack communication. The common software is responsible for hardware arbitration and provides a framework within which the protocol stack software runs.

To facilitate the description of the exemplary embodiments the technical implementation description is made in the context of a dual SIM case, i.e., the modem supports two SIM cards or devices. However, the exemplary embodiments of this invention are not limited to the use of two SIMs, and can be used with three or more SIMs.

Figure 1:
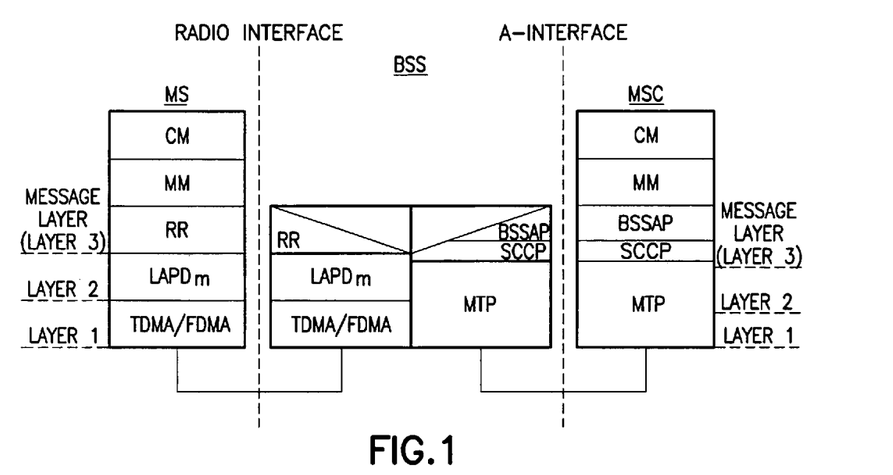
FIG. 1 shows the elements of a GSM protocol architecture.

By way of introduction and technical background, FIG. 1 shows a global system for mobile communication (GSM) protocol architecture of a mobile station (MS), base station system (BSS) and mobile switching center (MSC). Referring specifically to the MS, layer 1 (L1, TDM/FDMA) is the physical layer that uses various channel structures over the air interface. Layer 2 (L2, LAPD$_m$) is the data link layer. Layer 3 (L3, message layer) is partitioned into three sub-layers: the radio resource management sub-layer (RR), the mobility management sub-layer (MM) and the connection management sub-layer (CM). The RR sub-layer is responsible for link establishment between the MS and the MSC. In general, the RR sub-layer is concerned with management of a RR session, when the MS is in dedicated mode, and the configuration and allocation of radio channels. The MM sub-layer overlies the RR sub-layer and is responsible for the functions related to mobility, authentication and security. The CM sub-layer is responsible for, among other functions, supplementary service management, short message service (SMS) management, call establishment, selection of service type and call release.

Figure 4:
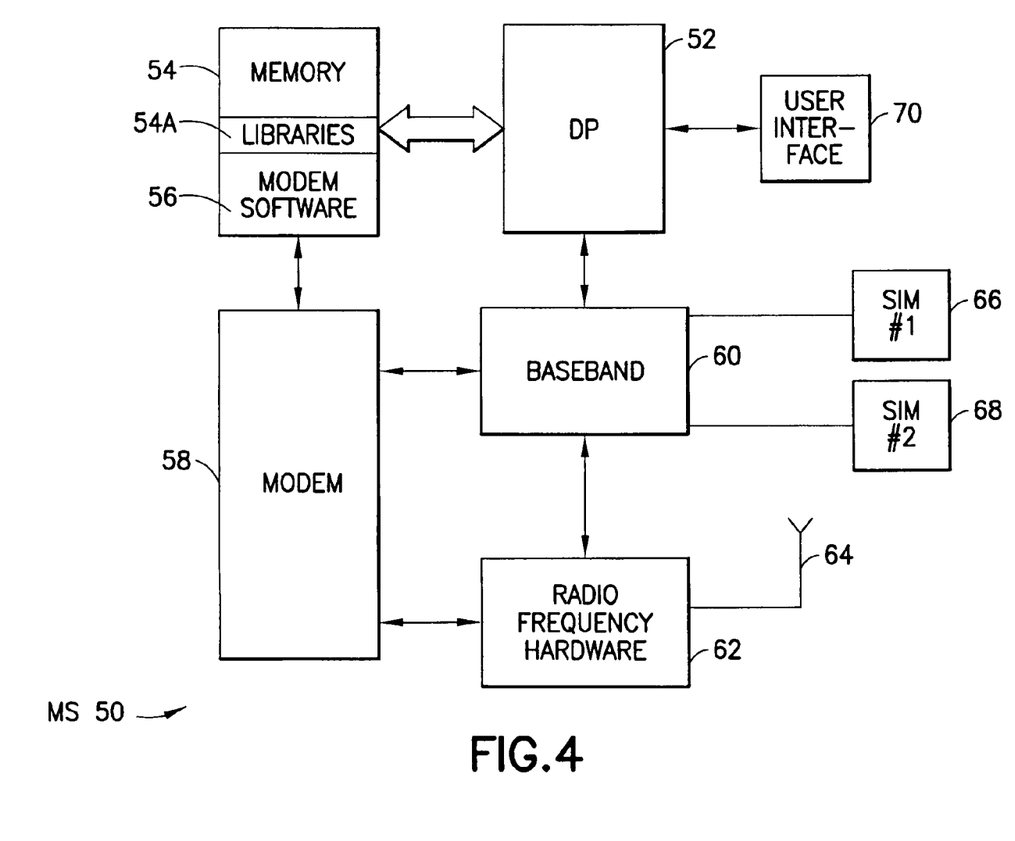
FIG. 4 is a simplified block diagram of a wireless communication device, such as a mobile station that is one suitable embodiment of hardware/software in which the exemplary embodiments of this invention can be implemented.

Reference is now briefly made to FIG. 4 which shows a device, such as a MS 50, that is constructed and operated in accordance with the exemplary embodiments of this invention. The MS 50 includes at least one controller, such as at least one data processor (DP) 52, that is connected with at least one non-transitory computer-readable storage medium embodied as at least one memory 54. The memory 54 stores operating software for the MS 50, such as an operating system (OS) and user application software, as well as modem software 56. The MS also includes a modem functional block 58, a baseband functional block 60, and radio frequency (RF) hardware block 62. The radio frequency hardware 62 includes at least one RF transmitter and receiver pair (a transceiver) and is connected during use with at least one antenna 64. The modem 58 may be assumed to include all or at least some of the functionality of the baseband functional block 60 and the RF hardware block 62. During use the MS 50 can have at least two SIM cards installed, shown as SIM #1 66 and SIM #2 68 connected logically with the baseband functional block 60. Some type of suitable user interface 70 is typically provided, such as a touch-sensitive display screen, for enabling a user to interact with and control the functionality of the MS 50 at least in order to make voice or data calls via modem 58 and the antenna 64.

Figure 2:
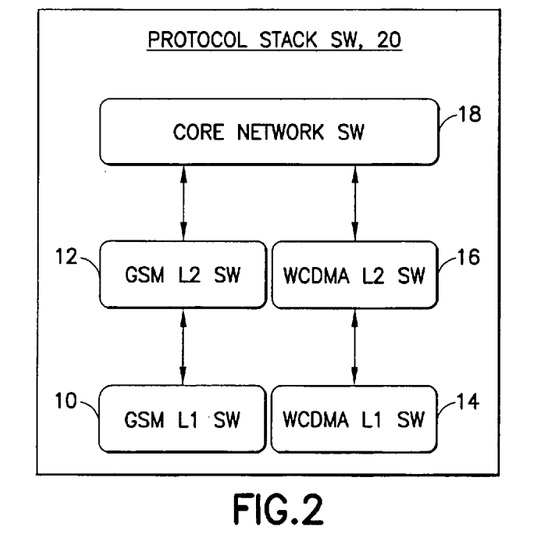
FIG. 2 shows a protocol stack software component that is an aspect of the exemplary embodiments of this invention.
Figure 3:
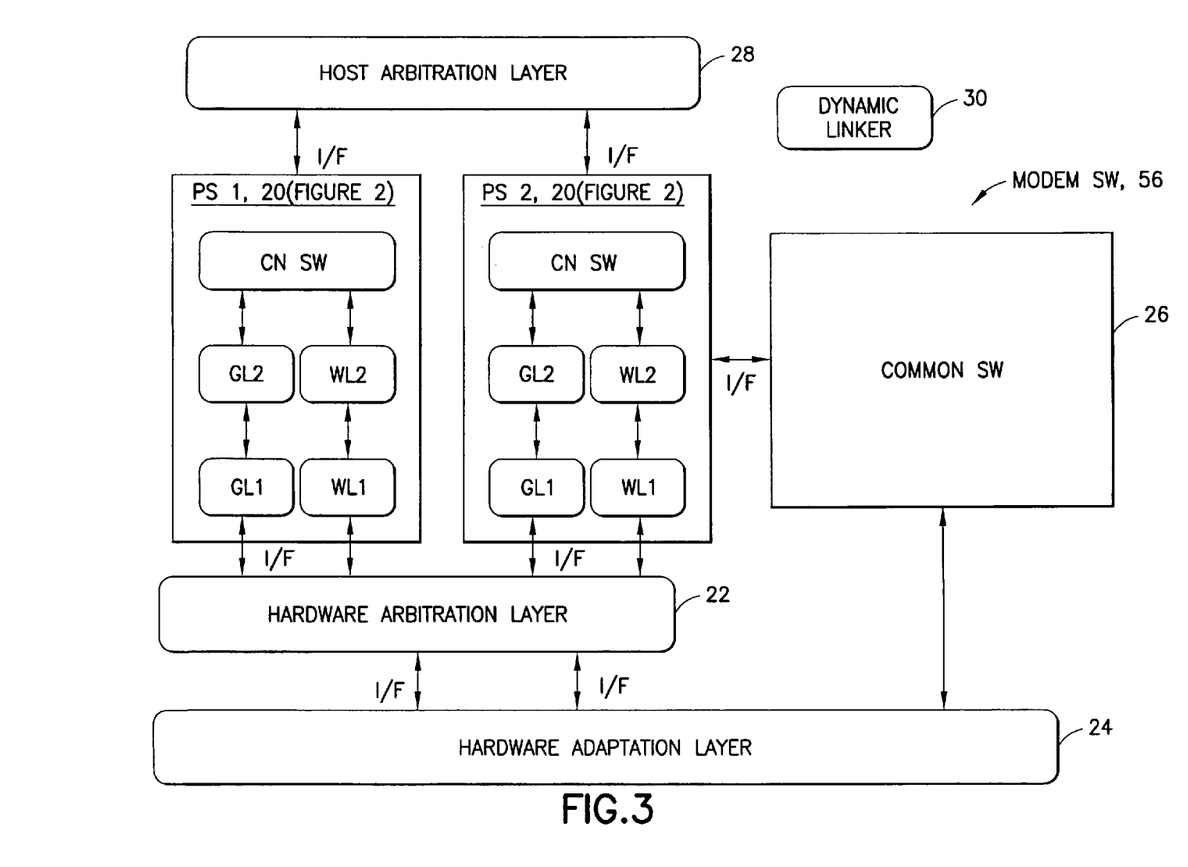
FIG. 3 shows a modem software architecture that provides dual SIM support that is an aspect of the exemplary embodiments of this invention.

FIG. 2 shows an embodiment of protocol stack SW 20 that forms a part of the modem software 56 (see FIG. 3). In FIG. 3 depicted are two exemplary dual mode GSM/WCDMA (wideband code division multiple access) protocol stacks, each of which can be assumed to be associated with a different one of the SIMs 66, 68. In the single-SIM case the protocol stack typically supports both/multiple standards, i.e. modes. In the dual-SIM case, each of the duplicated protocol stacks is itself multi-mode, i.e., can support both GSM and WCDMA, depending on the current situation in the network that the SIM is attached to.

It should be appreciated that in other exemplary and non-limiting embodiments other than GSM and WCDMA can be supported such as, for example, code division multiple access (CDMA), time division synchronous code division multiple access (TD-SCDMA), universal mobile telecommunications network (UMTS), UMTS terrestrial radio access network (UTRAN) and enhancements thereto such as long term evolution (LTE) and evolved or enhanced UTRAN (E-UTRAN), including release 8 (Rel-8), Rel-9, Rel-10 and higher releases thereof, encompassing as well LTE-A (LTE advanced), and various combinations of these and other standards and protocols. Note that some of the standards and protocols have a similar air interface, e.g., WCDMA, UMTS and UTRAN are basically the same, as are LTE and E-UTRAN.

More specifically, and still referring to the non-limiting embodiment of FIG. 2, in accordance with the exemplary embodiments there is the GSM L1 software (SW) 10, the GSM L2 SW 12, the WCDMA L1 SW 14 and the WCDMA L2 SW 16, as well as core network (CN) SW 18. The illustrated exemplary SW elements provide GSM and WCDMA cellular system support for the MS 50 having the modem software 56. In FIG. 4 the SIM #1 may provide the GSM connectivity and the SIM #2 may provide the WCDMA connectivity or, for example, like shown in FIG. 3, SIM #1 (and/or SIM #2) can provide both GSM and WCDMA cellular system support for the MS 50, i.e., any one of the SIMs can be a dual mode (or higher) device. It should be noted that the protocol stacks can have similar cellular capabilities (e.g., GSM/WCDMA as shown). The core network software 18 comprises Layer 3 SW and it part of each protocol stack, and is not part of the common SW shown in FIG. 3 which instead includes software elements to provide a framework for the protocol stack SW 20 to run in. Examples of such software elements are an operating system and a messaging infrastructure. Moreover, each protocol stack can include both WCDMA and GSM L1 and L2 SW, and essentially can be viewed as being a dual system protocol stack. Note that as was indicated above the exemplary embodiments are not limited to the GSM and WCDMA standards and can be applied to any cellular systems such as GSM, WCDMA, CDMA, TD-SCDMA, LTE (E-UTRAN) and others, or any combination of those supported by the protocol stack.

It should be noted that the protocol stacks #1 and #2 can be built from the same source code if their cellular system capabilities are the same. Building them from the same source code base facilitates maintenance and decreases associated costs.

In this embodiment the layers 1 and 2 of each protocol stack may be assumed to embody the above-mentioned native protocol stack functionality. Above the layers 1 and 2 the core network SW 18 embodies at least a layer 3 (having at least the higher layer RR, MM and CM functionality) that is used by both the GSM and WCDMA native protocol stack functionality (L1 and L2).

Referring now also more specifically to the non-limiting example of FIG. 3, the modem software 56 contains two protocol stacks SW 20 each of which is composed of GSM protocol stack SW 10, 12 (SW #1), WCDMA protocol stack SW 14, 16 (SW #2) and the CN SW 18, all as shown in FIG. 2. It should thus be noted that there can be multiple instances of the protocol stacks SW 20 (two are shown in FIG. 3, but there could be more than two instances present). The common SW 26 includes protocol stack framework software elements, a hardware (HW) arbitration layer 22, a HW adaptation layer 24 and a host arbitration layer 28. The host arbitration layer 28 provides an interface with the host device, such as the data processor 52 of the MS 50. Interfaces (I/Fs) are provided between these various software modules/functions enabling communication between them, such as through the use of function calls. The common SW 26 is linked into a modem software 56 image.

In general, the purpose of the hardware adaptation layer 22 (HAL) is to hide HW-specific details from most of the higher level SW components. The hardware adaptation layer 24 is comprised of lower level SW components, also referred to as drivers. Such an architecture allows one to port SW code to a new HW platform (e.g., one with new RF or baseband blocks) with a minimum amount of changes being required, since only the code (e.g., driver code) of the hardware adaptation layer 24 has to be changed. The hardware adaptation layer 24 can also be referred to, without a loss of generality, as a hardware abstraction layer.

While shown as separate elements In FIG. 3 the hardware (HW) arbitration layer 22, HW adaptation layer 24 and the host arbitration layer 28 may all be considered to form a part of the common SW 26.

In general, the common SW 26 can be considered to be that part of the modem software 56 image that serves multiple protocol software stacks. It is linked together with protocol stack software parts to form a final modem software 56 executable.

As was noted above, the two protocol stack SW components 10, 12 and 14, 16, along with the core network SW 18, contain the native protocol software functionality. Note again that the protocol stack SW #1 and protocol stack SW #2 can be identical (e.g., both could be dual mode GSM/WCDMA protocol stacks, but associated with different telephone numbers) or they, can be different, e.g., protocol stack SW #1 could be dual-mode GSM/WCDMA capable while protocol stack SW #2 could by GSM-only capable, and they can each be built from the same source code into dynamic objects. The dynamic objects are linked at run time with the common SW 26. Alternatively the protocol stack SW #1 and protocol stack SW #2 can be built into a SW library 54A and linked statically to the modem software 56 image.

There are thus at least two approaches to linking the common SW 26 with the protocol stack SW 20. Depending on the linking approach selected a problem related to duplicated symbols of the protocol stack SW 20, if the protocol stack SW #1 and protocol stack SW#2 are built from the same source code, is handled differently. In general, herein a 'symbol' refers to a function and a 'data symbol' refers to a variable.

In a first approach the final linking of the modem software 56 image, which includes the common SW 26 and the protocol stack dynamic objects, occurs at run-time using a dynamic linker 30.

The dynamic linker 30 is a separate part of the modem software 56 that links build-time partially-linked modem software images and additional dynamic objects (or dynamically linked libraries) into the final modem software 56 executable. In the context of the exemplary embodiments of this invention the dynamic linker 30 can link the common SW 26 image and the protocol stack dynamic objects (these can be partially linked during SW build time). The dynamic linker 30 runs first during boot up of the MS 50 SW to complete the linking of the modem software 56 executable, which then is enabled to begin to run immediately after the dynamic linker 30 completes its operations. Essentially the dynamic linker 30 may be considered to trigger execution of the modem software 56.

An additional variation of the dynamic linker 30 is an offline linker that operates similarly to the dynamic linker but it is run statically/offline before the system starts to boot up. Essentially, the off-line linker composes a final modem software executable that is ready to be run whenever the system is powered up.

With this first approach the dynamic linker 30 resolves the references between the common SW 26 and the dynamic objects that represent the protocol stack SW 20.

There are at least two basic techniques to address a problem that can arise due to the potential presence of duplicated symbols of the protocol stack software 20, where these symbols need to be accessed by the common SW 26. In a first approach the protocol stack SW 20 registers callbacks for the services that the common SW 26 needs to invoke. In this way the protocol stack software 20 does not export any linking symbols and the dynamic linker 30 does not need to deal with any duplicated symbols. In a second approach the protocol stack SW 20 exports symbols of the services the common SW 26 has to invoke and the common SW 26 imports these symbols. The symbols can then be accessed via an array, where a protocol stack identifier (e.g., protocol stack SW #1 or #2) serves as an index into the symbol array. In essence the array contains addresses of the symbols, e.g., function pointers, referring to different protocol stack memory areas (areas within the memory 54).

The 'services' in this context generally include interface functions. One non-limiting example of such a service is a protocol stack software message handler that dispatches all the messages sent to the protocol stack software and routes them further to the internal recipients.

In the second approach to linking the common SW 26 with the protocol stack SW 20 the statically linked modem software 56 image includes both the common SW 26 and protocol stack libraries (which can be assumed to be stored in the memory 54 as libraries 54A). This approach uses an additional preprocessing stage to avoid the problem of having duplicated symbols in the libraries. For example, the global symbols of the protocol stacks can be appended with the suffix indicating an ID of the protocol stack.

The interfaces that the protocol stack software 20 accesses from the common SW 26 are exported to the dynamic linker 30 when the dynamic linking option is used. In many cases the common SW 26 needs to have knowledge of the protocol stack software ID from where the call of the interface function is made. The protocol stack software 20 itself may not be aware of the ID and does not pass this parameter via an interface call. However, the common SW 26 can determine the protocol stack ID based on the return address of the function call. The dynamic linker 30 is aware of the memory address ranges that each protocol stack SW 20 resides in, and these memory address ranges can be made available for the common SW 26 to use. The retrieved protocol stack ID parameter can be then used in further operations that take place in the common SW 26, e.g., embedded into a message sent to another software entity.

To summarize, it can be assumed that the protocol stack ID parameter is neither known nor handled by the protocol stack SW 20, but can be used freely in the common SW 26.

In at least some embodiments of this invention the protocol stack SW 20 and the common SW 26 do not share any global data symbols. In the event that data has to be accessed by both the protocol stack SW 20 and the common SW 26 a pointer to the data is passed via a parameter of an interface function call.

The hardware adaptation layer 24 does not require significant changes as compared to the single SIM case. However the hardware arbitration layer 22, which forms a part of the exemplary embodiments of this invention, is introduced to resolve conflicts when the different protocol stack software elements (SW #1, SW #2) need to access the same hardware block (e.g., in the RF hardware 62) at the same time. In such cases the protocol stack software 20 requests access to the hardware adaptation layer 24 via an interface from the hardware arbitration layer 22. When permission is given by the hardware arbitration layer 22 the protocol stack software 20 can access the hardware adaptation layer 24. Alternatively the hardware arbitration layer 22 makes the requested RF hardware 62 access itself, and hides or conceals the interface of the hardware adaptation layer 24 from the protocol stack SW 20.

The common SW 26 can access the hardware adaptation layer 24 directly since it is multi-SIM aware and is not expected to share the same hardware blocks with the protocol stack SW 20.

The exemplary embodiments of this invention thus provide an efficient way to add multiple SIM support into conventional single SIM modem software. Much of the software can be kept as such and do not require any changes. Modifications are made in the common/core services to handle multiple protocol stack requests, and selected protocol stack software parts are separated into the host arbitration 28 and hardware adaptation 24 layers. In addition, the hardware arbitration layer 22 is provided as an interface between the protocol stack SW 20 and the hardware adaptation layer 24.

Note that the use of the exemplary embodiments enables optimizations to be made to the modem software 56. For example, some parts of the protocol stack software 20 can be moved to the common SW 26 in order to, for example, decrease the memory footprint of the modem executable image.

Further, in that the protocol stack software elements (e.g., 10, 12 and 14, 16) are isolated from one another the addition of at least a third protocol stack to the system (e.g., increment from dual SIM to triple SIM) can be performed without requiring any changes to the existing protocol stack software elements.

In addition, portability of the multi-SIM modem software 56 from one hardware platform to another is facilitated by locating the hardware adaptation layer 24 in the common SW 26, as ultimately this is the only layer that needs to be modified when porting the modem software 56 to another hardware platform.

In general, it can be noted that having two simultaneous active calls would assume the presence of at least two RF circuits in the system. However, the digital baseband logic does not necessarily have to be duplicated to handle two active calls. For devices with a dual standby feature, but without simultaneous call support, a single RF circuit would be sufficient.

The exemplary embodiments provide a technique to convert single SIM modem software into modem software 56 with multiple SIM support. The multiple SIM support modem software 56 may be assumed to be run on the single modem 58 and digital baseband logic 60. This is accomplished at least in part by having the hardware arbitration layer 22 that serves only one protocol stack at a time. The actual number and types of RF circuits of the RF hardware 62 implementation can vary from device implementation to device implementation.

Based on the foregoing it should be apparent that the exemplary embodiments of this invention provide a method, apparatus and computer program(s) to enhance the operation of a multi-SIM wireless communication device.

Figure 5:
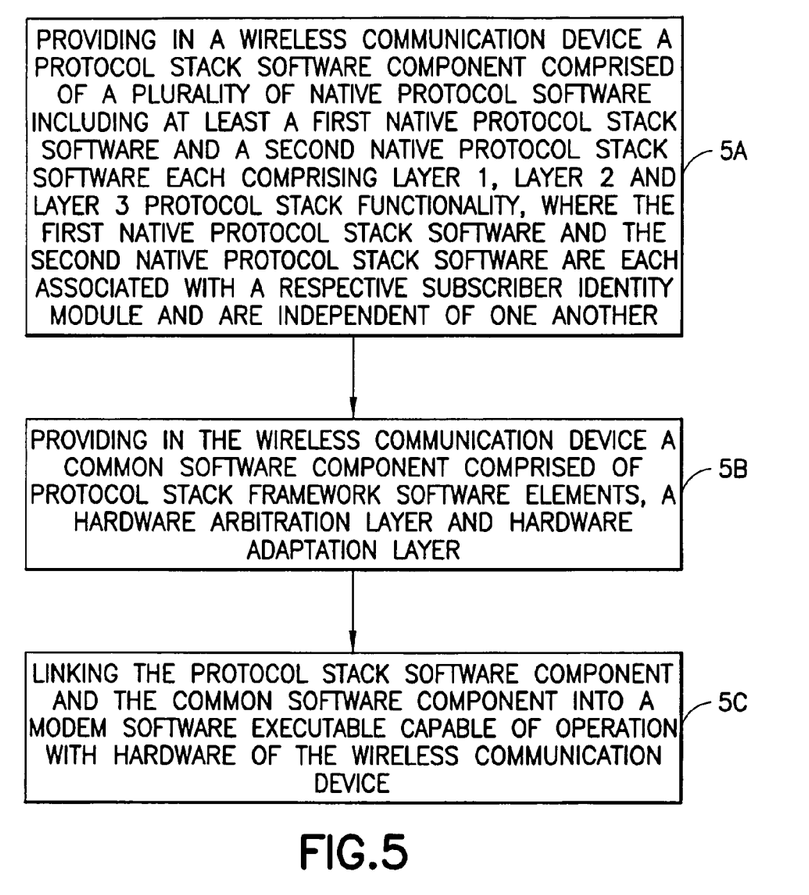
FIG. 5 is a logic flow diagram that illustrates the operation of a method, and a result of execution of computer program instructions, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 5A, a step of providing in a wireless communication device a protocol stack software component comprised of a plurality of native protocol stack software including at least a first native protocol stack software and a second native protocol stack software each comprising layer 1, layer 2 and layer 3 protocol stack functionality, where the first native protocol stack software and the second native protocol stack software are each associated with a respective subscriber identity module and are independent of one another. At Block 5B there is a step of providing in the wireless communication device a common software component comprised of protocol stack framework software elements, a hardware arbitration layer and a hardware adaptation layer. At Block 5C there is a step of linking the protocol stack software component and the common software component into a modem software executable capable of operation with hardware of the wireless communication device.

In the method as in FIG. 5, where linking occurs at run-time using a dynamic linker, and where the dynamic linker resolves references between the common software component and dynamic objects that represent the protocol stack software component. Linking can occur as well in a static manner using an offline linker.

In the method as in the preceding paragraph, where the protocol stack software component registers callbacks for services to be invoked by the common software component for the first native protocol stack software and the second native protocol stack software, or where the protocol stack software component exports to the common software component linking symbols for services to be invoked by the common software component for the first native protocol stack software and the second native protocol stack software, where the symbols are stored in an array and accessed by the common software component using a protocol stack software identifier that serves as an index into the symbol array to avoid an occurrence of symbol duplication.

In the method as in FIG. 5, where linking occurs to provide a statically linked modem software image that includes both the common software component and protocol stack libraries corresponding to the first native protocol stack software and the second native protocol stack software, where global symbols of the first native protocol stack software and the second native protocol stack software comprise an identifier of the associated native protocol stack software.

In the method as in FIG. 5, and further comprising the common software component determining an identity of the first native protocol stack software or the second native protocol stack software based on a return address of a received function call.

In the method as in FIG. 5, and further comprising the hardware arbitration layer being responsive to a hardware request from one of the first native protocol stack software and the second native protocol stack to grant permission for the requesting one of the native protocol stack software to access the hardware adaptation layer.

In the method as in FIG. 5, and further comprising the hardware arbitration layer being responsive to a hardware request from one of the first native protocol stack software and the second native protocol stack to access the hardware adaptation layer for the requesting one of the native protocol stack software.

In the method of FIG. 5 and the preceding several paragraphs, where the protocol stack software component supports global system for mobile communication (GSM), wideband code division multiple access (WCDMA), code division multiple access (CDMA), time division synchronous code division multiple access (TD-SCDMA), universal mobile telecommunications network (UMTS), UMTS terrestrial radio access network (UTRAN) and enhancements thereto including long term evolution (LTE) and evolved or enhanced UTRAN (E-UTRAN), including release 8 (Rel-8), Rel-9, Rel-10 and higher releases thereof, LTE-A (LTE advanced), and various combinations of at least these and other standards and protocols.

The exemplary embodiments also encompass a non-transitory computer-readable medium that contains software program instructions, where execution of the software program instructions by at least one data processor results in performance of operations that comprise execution of the method of FIG. 5.

The various blocks shown in FIG. 5 may be viewed as method steps, and/or as operations that result from operation of computer program code, and/or as a plurality of coupled logic circuit elements constructed to carry out the associated function(s).

The exemplary embodiments also provide an apparatus that comprises at least one processor and at least one memory. The memory stores computer program code and a protocol stack software component comprised of a plurality of native protocol stack software including at least a first native protocol stack software and a second native protocol stack software each comprising layer 1, layer 2 and layer 3 protocol stack functionality, where the first native protocol stack software and the second native protocol stack software are each associated with a respective subscriber identity module and are independent of one another. The memory further stores a common software component comprised of protocol stack framework software elements, a hardware arbitration layer and a hardware adaptation layer. In the apparatus the memory and computer program code are configured, with the at least one processor, to cause the apparatus to link the protocol stack software component and the common software component into a modem software executable capable of operation with hardware of a wireless communication device.

The exemplary embodiments also provide an apparatus that comprises means for providing in a wireless communication device a protocol stack software component comprised of a plurality of native protocol stack software including at least a first native protocol stack software and a second native protocol stack software each comprising layer 1, layer 2 and layer 3 protocol stack functionality, where the first native protocol stack software and the second native protocol stack software are each associated with a respective subscriber identity module and are independent of one another. The apparatus further comprises means for providing in the wireless communication device a common software component comprised of protocol stack framework software elements, a hardware arbitration layer and a hardware adaptation layer. The apparatus further comprises means for linking the protocol stack software component and the common software component into a modem software executable capable of operation with hardware of the wireless communication device.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Further, the various embodiments of the MS 50 can include, but are not limited to, cellular telephones, personal digital assistants (PDAs) having multi-SIM wireless communication capabilities, portable computers having multi-SIM wireless communication capabilities, image capture devices such as digital cameras having multi-SIM wireless communication capabilities, gaming devices having multi-SIM wireless communication capabilities, music storage and playback appliances having multi-SIM wireless communication capabilities, Internet appliances permitting wireless Internet access and browsing, as well as portable units or terminals that incorporate combinations of such functions.

The memory 54 shown in FIG. 4 may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The DP 52 may also be of any type suitable to the local technical environment, and may include one or more of general purpose computers, special purpose computers, microprocessors, digital signal processors (DSPs) and processors based on multi-core processor architectures, as non-limiting examples.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the GSM and WCDMA cellular communication systems, it should be appreciated that the exemplary embodiments of this invention are not limited for use with only these particular types of wireless communication systems, and that they may be used to advantage in other wireless communication systems such as, for example, the UTRAN and E-UTRAN systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters are not intended to be limiting in any respect, as these parameters may be identified by any suitable names. Further, the various names assigned to different hardware/software elements (e.g., hardware arbitration layer, hardware adaptation layer, etc.) are not intended to be limiting in any respect, as these various hardware/software elements may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
providing in a wireless communication device a protocol stack software component comprised of a plurality of native protocol stack software including at least a first native protocol stack software and a second native protocol stack software each comprising layer 1, layer 2 and layer 3 protocol stack functionality, where the first native protocol stack software and the second native protocol stack software are each associated with a respective subscriber identity module and are independent of one another;
providing in the wireless communication device a common software component, separate from the first native protocol stack software and the second native protocol stack software, comprised of protocol stack framework software elements, a hardware arbitration layer and a hardware adaptation layer; and
linking objects of the protocol stack software component, including the first native protocol stack software and the second native protocol stack software, with the common software component to form a modem software executable capable of operation with hardware of the wireless communication device;
where the hardware adaptation layer is comprised of software drivers for underlying hardware, and where the hardware arbitration layer is responsive to a hardware access request from one of the first native protocol stack software and the second native protocol stack to access the requested hardware itself while concealing an interface to the hardware adaptation layer from the requesting one of the native protocol stack software.

2. The method of claim 1, where linking occurs at run-time using a dynamic linker or statically using an offline linker.

3. The method of claim 2, where the dynamic linker resolves references between the common software component and dynamic objects that represent the protocol stack software component.

4. The method of claim 2, where the protocol stack software component registers callbacks for services to be invoked by the common software component for the first native protocol stack software and the second native protocol stack software.

5. The method of claim 2, where the protocol stack software component exports to the common software component linking symbols for services to be invoked by the common software component for the first native protocol stack software and the second native protocol stack software, where the symbols are stored in an array and accessed by the common software component using a protocol stack software identifier that serves as an index into the symbol array to avoid an occurrence of symbol duplication.

6. The method of claim 1, where linking occurs to provide a statically linked modem software image that includes both the common software component and protocol stack libraries corresponding to the first native protocol stack software and the second native protocol stack software, where global symbols of the first native protocol stack software and the second native protocol stack software comprise an identifier of the associated native protocol stack software.

7. The method of claim 1, further comprising the common software component determining an identity of the first native protocol stack software or the second native protocol stack software based on a return address of a received function call.

8. The method of claim 1, where the protocol stack software component supports global system for mobile communication (GSM), wideband code division multiple access (WCDMA), code division multiple access (CDMA), time division synchronous code division multiple access (TD-SCDMA), universal mobile telecommunications network (UMTS), UMTS terrestrial radio access network (UTRAN) and enhancements thereto including long term evolution (LTE) and evolved or enhanced UTRAN (E-UTRAN), including release 8 (Rel-8), Rel-9, Rel-10 and higher releases thereof, LTE-A (LTE advanced), and various combinations of at least these and other standards and protocols.

9. A non-transitory computer-readable medium that contains software program instructions, where execution of the software program instructions by at least one data processor results in performance of operations that comprise execution of the method of claim 1.

10. An apparatus, comprising:
at least one processor; and
at least one memory that stores computer program code and a protocol stack software component comprised of a plurality of native protocol stack software including at least a first native protocol stack software and a second native protocol stack software each comprising layer 1, layer 2 and layer 3 protocol stack functionality, where the first native protocol stack software and the second native protocol stack software are each associated with a respective subscriber identity module and are independent of one another, the memory further storing a common software component, separate from the first native protocol stack software and the second native protocol stack software, comprised of protocol stack framework software elements, a hardware arbitration layer and a hardware adaptation layer, where the memory and computer program code are configured, with the at least one processor, to cause the apparatus to link objects of the protocol stack software component, including the first native protocol stack software and the second native protocol stack software, with the common software component to form a modem software executable capable of operation with hardware of a wireless communication device;
where the hardware adaptation layer is comprised of software drivers for underlying hardware, and where the hardware arbitration layer is responsive to a hardware access request from one of the first native protocol stack software and the second native protocol stack to access the requested hardware itself while concealing an interface to the hardware adaptation layer from the requesting one of the native protocol stack software.

11. The apparatus of claim 10, where linking occurs at run-time using a dynamic linker or statically using an offline linker.

12. The apparatus of claim 11, where the dynamic linker resolves references between the common software component and dynamic objects that represent the protocol stack software component.

13. The apparatus of claim 11, where the protocol stack software component registers callbacks for services to be invoked by the common software component for the first native protocol stack software and the second native protocol stack software.

14. The apparatus of claim 11, where the protocol stack software component exports to the common software component linking symbols for services to be invoked by the common software component for the first native protocol stack software and the second native protocol stack software, where the symbols are stored in an array and accessed by the common software component using a protocol stack software identifier that serves as an index into the symbol array to avoid an occurrence of symbol duplication.

15. The apparatus of claim 10, where linking occurs to provide a statically linked modem software image that includes both the common software component and protocol stack libraries corresponding to the first native protocol stack software and the second native protocol stack software, where global symbols of the first native protocol stack software and the second native protocol stack software comprise an identifier of the associated native protocol stack software.

16. The apparatus of claim 10, further comprising the common software component determining an identity of the first native protocol stack software or the second native protocol stack software based on a return address of a received function call.

17. The apparatus of claim 10, where the plurality of native protocol stack software and common software component execute with a single modem and digital baseband hardware.

18. The apparatus of claim 10, where the protocol stack software component supports global system for mobile communication (GSM), wideband code division multiple access (WCDMA), code division multiple access (CDMA), time division synchronous code division multiple access (TD-SCDMA), universal mobile telecommunications network (UMTS), UMTS terrestrial radio access network (UTRAN) and enhancements thereto including long term evolution (LTE) and evolved or enhanced UTRAN (E-UTRAN), including release 8 (Rel-8), Rel-9, Rel-10 and higher releases thereof, LTE-A (LTE advanced), and various combinations of at least these and other standards and protocols.

19. The apparatus as in claim 10, where the wireless communication device is a cellular phone capable of concurrent operation with a plurality of subscriber identity modules.

20. A method, comprising:

providing in a wireless communication device a protocol stack software component comprised of a plurality of native protocol stack software including at least a first native protocol stack software and a second native protocol stack software each comprising layer 1, layer 2 and layer 3 protocol stack functionality, where the first native protocol stack software and the second native protocol stack software are each associated with a respective subscriber identity module and are independent of one another;

providing in the wireless communication device a common software component, separate from the first native protocol stack software and the second native protocol stack software, comprised of protocol stack framework software elements, a hardware arbitration layer and a hardware adaptation layer; and linking objects of the protocol stack software component, including the first native protocol stack software and the second native protocol stack software, with the common software component to form a modem software executable capable of operation with hardware of the wireless communication device, where linking occurs at run-time using a dynamic linker or statically using an offline linker, and where the protocol stack software component exports to the common software component linking symbols for services to be invoked by the common software component for the first native protocol stack software and the second native protocol stack software, where the symbols are stored in an array and accessed by the common software component using a protocol stack software identifier that serves as an index into the symbol array to avoid an occurrence of symbol duplication.

21. The method of claim 20, further comprising the common software component determining an identity of the first native protocol stack software or the second native protocol stack software based on a return address of a received function call.

* * * * *